Dec. 4, 1934.   E. R. ANDERSON   1,982,944
METHOD FOR PREPARING SPINACH FOR CANNING
Filed Nov. 2, 1931
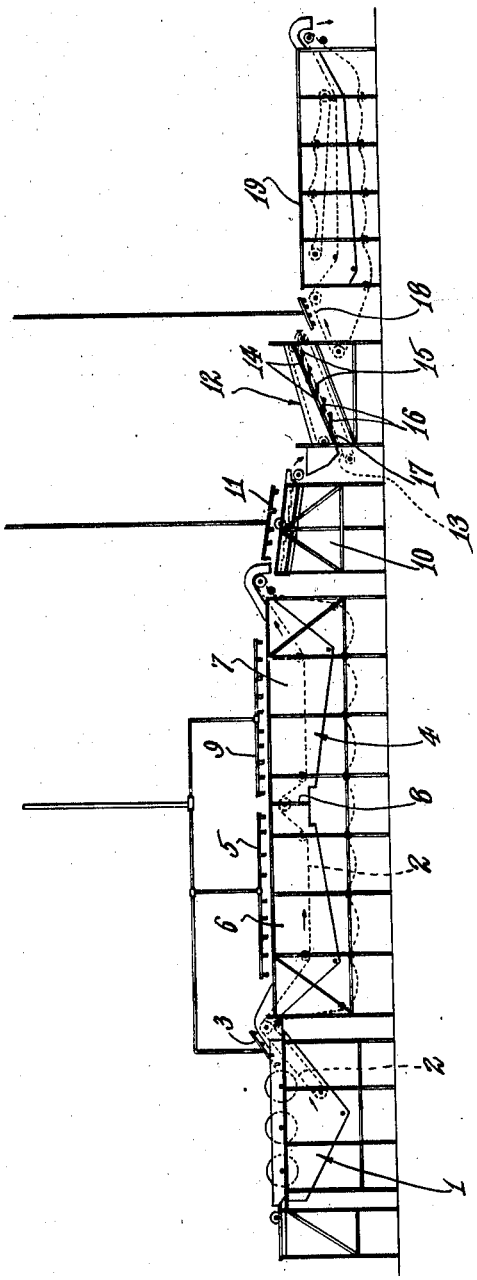
Inventor
Earl R. Anderson
By Lyon & Lyon
Attorneys Patented Dec. 4, 1934

1,982,944

UNITED STATES PATENT OFFICE 1,982,944

METHOD FOR PREPARING SPINACH FOR CANNING

Earl R. Anderson, Los Angeles, Calif., assignor to Food Machinery Corporation, San Jose, Calif., a corporation of Delaware Application November 2, 1931, Serial No. 572,465

9 Claims. (Cl. 99—8)

This invention relates to a process for preparing spinach or other green leaf vegetables for canning, and more particularly to a process and apparatus for preparing spinach wherein the spinach is crushed before blanching.

It is an object of this invention to provide a method and operation for preparing spinach or other green leaf vegetables for canning wherein the reduction of the bulk of the spinach or other green leaf vegetable is obtained resulting in a saving of time by a shorter blanching step, a saving in steam by the use of lower blanching temperatures, and wherein the expense of equipment is saved by the greater capacities obtained.

Another object of this invention is to provide a process for preparing spinach or other green leaf vegetables for canning in which process the gases are released from the stems prior to the blanching of the spinach or other green leaf vegetables, reducing the oxidation and destruction of color.

Another object of this invention is to provide a method of preparing spinach or other green leaf vegetables for canning wherein water soluble substances are removed from the stems, which substances cause dark liquor in the canned products, and which, if left, will destroy the color properties of the green pigments of the leaves of spinach or other green leaf vegetables.

Another object of this invention is to provide a method and apparatus for canning spinach wherein the spinach is washed, the crispness is then removed, the spinach is crushed, washed and then blanched and chilled.

Other objects and advantages of this invention it is believed will be apparent from the following detailed description of a preferred embodiment thereof as illustrated in the accompanying drawing.

In the drawing:

The figure is a diagrammatic view illustrating the apparatus used in carrying out my invention.

In the preparing of spinach and other green leaf vegetables for canning, considerable difficulty has been encountered in the handling of the spinach to retain more natural color and clear liquor in the canned product.

I have found that a considerable portion of this trouble is caused by water soluble matter contained and gases carried in the stems of the spinach or green leaf vegetables. I have also found that if the spinach or green leaf vegetable is treated after it is washed so that the stems of the spinach are crushed to release the gases therein, and to enable the removal of the water soluble substances, that this difficulty is obviated to a considerable degree, and the subsequent blanching of the spinach may be carried out at a lower temperature and in a greatly reduced period of time.

In carrying out the process embodied in my invention, the spinach is washed in any suitable or desirable type of washer, preferably of the continuous type.

After the spinach is washed to remove the foreign matter therefrom, it is subjected to the action of water, steam, heated air, or the like, to raise the temperature of the spinach or other green leaf vegetables to prevent splitting of the stems on subsequent treatment.

After the spinach has been treated to raise the temperature thereof it is subjected to the action of a crushing device which crushes the spinach or other green leaf vegetable reducing the bulk thereof and resulting in the compression of stems thereof so that the gases contained therein are released and so that the soluble matter contained in the stems may be subsequently removed.

After the spinach has been crushed it is washed to remove the soluble coloring matter and is thereafter blanched in any suitable or desirable form of blanching apparatus. The spinach or other green leaf vegetable is preferably sent through a continuous blancher where it is subjected to the action of hot water and the period of time required for blanching the spinach after it has been processed as hereinabove set forth is materially reduced and a material reduction of the temperature required for blanching is attained.

This process enables me to eliminate rolling heretofore practiced following blanching, which rolling operation must be very carefully followed in order to avoid mushing of the spinach, and this process also enables me to prepare the spinach for canning at temperatures where the spinach or other green leaf vegetable never reaches the break-down temperature of the cells thereof.

The apparatus embodying my invention consists preferably of a paddle washer 1 into which the spinach is first introduced, and from which the spinach is conveyed by means of a conveyor 2. As the spinach leaves the washer 1, it is subjected to the action of a spray 3 for the purpose of washing from the spinach the foreign matter adhering thereto. The spinach is conveyed by the conveyor 2 into a second washer 4, which is preferably of the double section spray type where the spinach on the conveyor 2 is subjected to the action of washing water from a spray 5 as it is conveyed to the first section 6 of the double section spray washer 4. The spinach passes from the first section 6 of the washer 4 to the second section 7 thereof over a dividing partition 8 upon the conveyor 2.

In the second section 7 it is subjected to the action of a further spray 9 of wash water while it is being conveyed through the washer 4 on the conveyor 2. When the spinach leaves the washer 4 on the conveyor 2, it is treated to remove the crispness of the spinach by subjecting it to the action of heat, preferably in the form of warm water from a spray 11 in a rinsing shaker 10. The shaker 10 may be of any suitable or desirable construction, which is well understood in the art, and the spinach in this shaker is subjected to a shaking apparatus for shaking from the spinach the last of the adhering foreign matter.

The spinach is discharged from the rinsing shaker 10 into a crushing device, which is preferably in the form of a continuous press 12 within which the spinach is crushed. The continuous press 12 includes a conveyor 13 by which the spinach is conveyed through the press 12, and as the spinach is conveyed through the press 12, it is subjected to the action of crushing rollers 14. The crushing pressure of the crushing rollers may be regulated by means of adjustable weights 15 adjustably carried by arms 16 secured to the frame 17 within which the rollers 14 are journaled.

As the spinach passes through the crusher it is crushed, but as it has not been subjected to a temperature great enough for a sufficiently long period of time to cook or scald the spinach, there is no danger of mushing the spinach during this operation. The crushing of the spinach results in the releasing of the gas from the stems of the spinach, and also so conditions the stems of the spinach that the soluble matter contained therein may be subsequently removed from the stems prior to the blanching of the spinach or green leaf vegetable.

The spinach from the crusher is delivered to an inclined conveyor 18 upon which it is subjected to a spray of washing water where the soluble matter released by the prior crushing step is washed from the spinach or other green leaf vegetable. The spinach or green leaf vegetable is delivered by the conveyor 18 preferably into a conveyor type blancher 19 which is of any suitable or desirable construction, and through which the spinach or green leaf vegetable is continuously conveyed. The temperature of water within the blancher 19 may be considerably reduced over that utilized in the blanching of the spinach which has not first been subjected to the crushing and washing steps heretofore described.

After the spinach passes through the blancher 19, it is canned in any suitable or desirable manner well known in the art.

Having fully described my invention, it is to be understood that I do not wish to be limited to the details herein set forth, but my invention is of the full scope of the appended claims.

I claim:

1. In a process of treating spinach or green leaf vegetables for canning, the steps of washing the spinach, crushing the spinach, and then blanching the spinach.

2. A method of treating spinach or green leaf vegetables for canning, including the steps of washing the spinach, subjecting the spinach to the action of warm water, crushing the spinach, and then blanching the spinach.

3. A process of treating spinach for canning, including the steps of washing the spinach, raising the temperature of the spinach, crushing the spinach, and then blanching the spinach.

4. The process of treating spinach or other green leaf vegetable for canning, including the steps of washing the spinach or other green leaf vegetable, treating, by raising the temperature thereof, the spinach or other green leaf vegetable to remove the crispness, crushing the spinach or other green leaf vegetable, washing the spinach or other green leaf vegetable to remove water soluble substances from the stems, and then blanching the spinach or other green leaf vegetable.

5. In a continuous process of treating spinach for canning, the steps of passing spinach continuously through a washing bath, passing the spinach through a bath of warm water, crushing the spinach to allow escape of gas from the stems thereof, and then blanching the spinach.

6. A process of treating spinach or other green leaf vegetable, including the steps of passing the vegetable continuously through a washing bath, then raising the temperature of the vegetable, crushing the vegetable to release the gas from the stems thereof, blanching, and then chilling the vegetable.

7. In a process of preparing green leaf vegetables for canning, the steps including washing the green leaf vegetable, subjecting it to warm water, steam, or heated air to increase the temperature, crushing the green leaf vegetable, washing the crushed green leaf vegetable to remove soluble coloring matter, and blanching the green leaf vegetable.

8. In a process of preparing green leaf vegetables for canning, the steps including the washing of the vegetable, subjecting it to warm streams of water or heated air to increase the temperature thereof, compressing the stems of the vegetable to release coloring matter thereof, removing the released coloring matter, and blanching the green leaf vegetable.

9. A process of treating spinach or other green leaf vegetable for canning, including the steps of washing the spinach, raising the temperature of the spinach, compressing the spinach to compress the stems thereof, and then blanching the spinach.

EARL R. ANDERSON.